United States Patent [19]
Christensen

[11] Patent Number: 5,470,120
[45] Date of Patent: Nov. 28, 1995

[54] BASE RAIL FOR UTILITY RACK

[76] Inventor: David Christensen, 11 Moores Mill Rd., Pennington, N.J. 08534

[21] Appl. No.: 110,388

[22] Filed: Aug. 23, 1993

Related U.S. Application Data

[63] Continuation-in-part of Ser. No. 908,979, Jul. 6, 1992, Pat. No. 5,238,280, which is a continuation-in-part of Ser. No. 762,575, Sep. 19, 1991, Pat. No. 5,137,320.

[51] Int. Cl.$^6$ .................. B60R 9/00; B60P 3/00
[52] U.S. Cl. ................. 296/3; 224/405; 224/541
[58] Field of Search .................. 296/3, 100, 36; 224/309, 321, 325, 42.42, 42.45 R, 42.46 R

[56] References Cited

U.S. PATENT DOCUMENTS

| | | | |
|---|---|---|---|
| 2,134,823 | 11/1938 | Herrmann et al. | |
| 3,877,624 | 4/1975 | Carson. | |
| 4,390,117 | 6/1983 | Fagan. | |
| 4,444,427 | 4/1984 | Martin. | |
| 4,693,508 | 9/1987 | Pettit | 296/100 |
| 4,984,837 | 1/1991 | Dise. | |
| 4,991,640 | 2/1991 | Verkindt et al. | 296/100 X |
| 5,002,324 | 3/1991 | Griffin. | |
| 5,052,739 | 10/1991 | Irwin | 296/100 X |
| 5,137,320 | 8/1992 | Christensen | 296/3 |
| 5,143,415 | 9/1992 | Boudah | 296/3 |
| 5,152,574 | 10/1992 | Tucker | 296/100 |
| 5,238,280 | 8/1993 | Christensen | 296/3 |
| 5,251,950 | 10/1993 | Bernardo | 296/100 X |
| 5,305,774 | 4/1994 | Hager | 296/100 X |

FOREIGN PATENT DOCUMENTS

| | | | |
|---|---|---|---|
| 1555611 | 10/1970 | Germany | 296/3 |
| 440621 | 1/1936 | United Kingdom | 296/3 |

Primary Examiner—Dean Kramer
Attorney, Agent, or Firm—Kenneth P. Glynn; Diane L. Ferrone

[57] ABSTRACT

The present invention is a ladder utility rack for pick-up cargo beds. It has two parallel horizontal base rails and at least two vertical stanchion units and has at least two suspension rods, one from each stanchion, and has at least one inner support beam connected to the suspension rods. Each base rail has at least one horizontal and one vertical running wall and each is adapted to nest atop and against sidewalls of a cargo bed. These base rails are not connected to one another except via the stanchion units. These stanchion units have vertical legs running from each of the base rails upwardly and inwardly and terminate at a commonly connected horizontal cross member. A preferred embodiment includes four suspension rods, two from each stanchion, and two inner support beams, each beam connected to a forward and a rearward suspension rod.

5 Claims, 3 Drawing Sheets

BASE RAIL FOR UTILITY RACK

REFERENCE TO RELATED CASES

This application is a continuation-in-part of U.S. patent application Ser. No. 07/908,979, filed on Jul. 6, 1992, entitled "Utility Rack With Enhanced Rails" now U.S. Pat. No. 5,238,280, which itself is a continuation-in-part of U.S. patent application Ser. No. 07/762,575, filed on Sep. 19, 1991, entitled "Ladder Utility Rack and Mounting Rail", now U.S. Pat. No. 5,137,320, both by the same inventor herein.

BACKGROUND OF THE INVENTION

1. Field of the Invention

This invention relates to utility racks for pick-up truck cargo beds and particularly such utility racks for carrying ladders and other items of substantial length which may typically exceed the length of a cargo bed. The invention further relates to such utility racks as they include one or more inner support beams to create support platforms for mounting items to be transported, e.g. tool boxes, storage bins, adapter plate mounted machinery, generators, compressors, and the like.

2. Information Disclosure Statement

With the development of cargo bed trucks came racks to support items for transport with frames for carrying lumber, glass, ladders, etc. They were initially made of wood and took on a box-like open frame configuration. Subsequently, metal racks were developed to increase both strength and longevity. While the development of ladder utility racks and other racks did not stand still, most improvements pertained to "enhancing" the basic open box-like framing by adding to it rather than changing the framing configuration itself.

U.S. Pat. No. 2,134,823 describes a 1938 ladder rack which is side mounted and includes a complex clamping lever. U.S. Pat. No. 3,877,624 describes a ladder rack involving a plurality of bows which transverse the top of a closed truck, wherein one of the bows has clamps to clamp ladders. The bows are independently attached to the vehicle and are not connected in any fashion. Further, they appear not to be adaptable to cargo beds for carrying items having lengths greater than the cargo bed.

U.S. Pat. No. 4,390,117 describes a ladder rack for vehicles involving parallel side members and transverse cross members. It is adapted for mounting on the roof of a vehicle and, again, would not be effective for a pick-up bed. Also, complex rack attachment and ladder attachment mechanisms are included.

U.S. Pat. No. 4,444,427 teaches an auxiliary structured element for pick-up cargo beds which includes a four sided frame and subsequent cross members for mounting a deck, e.g. a top with an access door.

U.S. Pat. No. 4,984,837 is directed to a load support assembly for pick-up trucks. This device has vertical mounting supports and a tiltable load support cross member. It is used for transporting items in the cargo bed tilted upwardly and forwardly; it is cab mounted and cannot carry lengthy items in a horizontal position.

Most recently issued U.S. Pat. No. 5,002,324 describes a utility rack for pick-up cargo beds. The rack has two inverted "U" type stanchions attached to a continuous rail that encompasses both sidewalls and the forward wall of the cargo bed, itself forming a "U" type configuration in the horizontal plane. The rear stanchion is movable and removable. This is different from the present invention in the extra weight and material required for the forward wall section of the continuous rail, whereas the present invention relies upon parallel rails not connected directly to one another. It is also more difficult to install since this prior art device has exact fixed width of separation of the rail due to the direct connection. It is also subject to loosening and wearing of the rear stanchion mounting parts and even subject to the possibility of accidental disassemblage of the rear stanchion. Finally, because of the need for close tolerances of the rear stanchion and its mounts, the precise separation of the rail at its rear portion is essential to enable a user to subsequently mount the rear stanchion. None of those shortcomings exist with the present invention device.

SUMMARY OF THE INVENTION

The present invention is a ladder utility rack for pick-up cargo beds. It has two parallel horizontal base rails and at least two vertical stanchion units and has at least two suspension rods, one from each stanchion, and has at least one inner support beam connected to the suspension rods. Each base rail has at least one horizontal and one vertical running wall and each is adapted to nest atop and against sidewalls of a cargo bed. These base rails are not connected to one another except via the stanchion units. These stanchion units have vertical legs running from each of the base rails upwardly and inwardly and terminate at a commonly connected horizontal cross member. A preferred embodiment includes four suspension rods, two from each stanchion, and two inner support beams, each beam connected to a forward and a rearward suspension rod.

BRIEF DESCRIPTION OF THE DRAWINGS

The present invention should be more fully understood when the specification herein is taken in conjunction with the drawings appended hereto, wherein.

DETAILED DESCRIPTION OF THE INVENTION

The utility rack of the present invention has as one of its objectives to provide a rack which is durable and yet less complex than conventional racks. It is also an objective to provide a utility rack which has an inwardly biased horizontal cross section for receiving ladders and the like away from the outer periphery of the vehicle. It is also an objective to provide an easily installable rack which may be adapted for acting as a platform for mounting other items for transport, such as tools, tool boxes, storage bins, generators, pumps, gas motors, etc.

Figure 1:
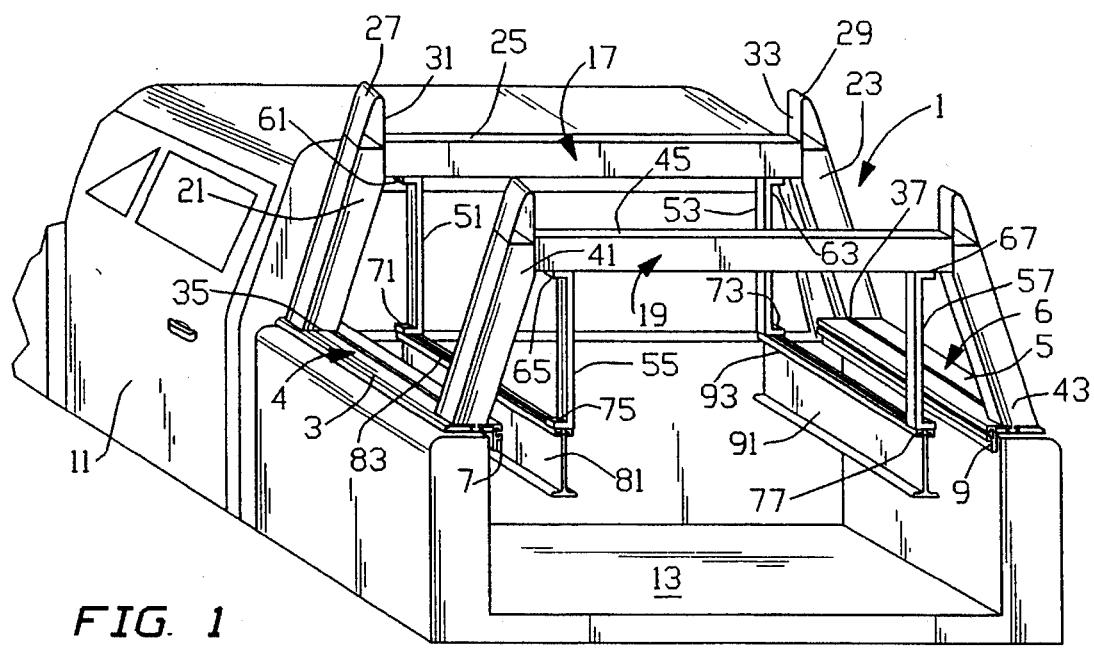
FIG. 1 shows a side perspective view of a present invention utility rack with two inner support beams and four suspension rods.

Referring now to FIG. 1 there is shown a top perspective view of a utility rack 1 mounted on cargo bed 13 of pick-up truck 11. A pair of base rails 4 and 6 have horizontal surfaces 3 and 5 and vertical surfaces 7 and 9, respectively. The horizontal surfaces 3 and 5 nest atop the sidewalls of cargo bed 13 and the vertical surfaces 7 and 9 seat against the sidewalls, as shown. They may be bolted down, welded or affixed by any known means.

Utility rack 1 includes stanchion units 17 and 19. Front stanchion unit 17 is attached to horizontal base rail surfaces 3 and 5 at the lower portions 35 and 37 of vertical legs 21 and 23 by T-fasteners, i.e. bolts and T-slots, as shown here, or by other means, e.g. by welding, bolting, a combination of these, or other known means of attachment. The vertical legs 21 and 23 extend upwardly and inwardly and are mounted forwardly, as shown, and are connected by horizontal cross member 25. Lateral support blocks 27 and 29 are atop cross member 25 and, although optional, are preferred. These keep ladders, lumber, pipes, etc., from sliding or rolling off laterally at their inside surfaces 31 and 33. Also, due to the inward configuration of the vertical legs (e.g. 21 and 23) such items as ladders are transported away from the outer periphery of the pick-up truck. This becomes important when the truck is in motion and turning. The center of gravity is better maintained and there may be less tipping. This is safer and will cause less wear of shocks and springs. Also, note that the stanchions are not connected directly to one another but are connected by the horizontal cross members, as shown.

Rear stanchion unit 19 has vertical legs 41 and 43 and these are similarly attached to the base rails as are legs 21 and 23. Also, they generally have the same cross sections, angles, sizes, etc., as the forward stanchion unit, and, although an exact replication is not critical, it is preferred.

As can be seen in FIG. 1, suspension rods 51 and 53 hang downwardly from forward stanchion 17 and suspension rods 55 and 57 hang downwardly from rearward stanchion 19, as shown. They are connected at their tops 61, 63, 65 and 67, respectively. At the bottoms 71 and 75 of rods 51 and 55 is inner support beam 81, having a flat top 83. Likewise, at the bottoms of 73 and 77 of rods 53 and 57 is inner support beam 91, having a flat top 93. The beams 81 and 91 are connected by any known means and, in this case, by the use of T-fasteners (i.e. fasteners that are T-shaped or inverted T-shaped in profile) and T-slots.

The beams 81 and 91 are referred to as "inner" support beams because they are located on the inside of the rails. They are "support" beams because they are utilized to support tool boxes, supplies, mounting plates, mounting connectors, power tools, hand tools, tanks and other equipment which may be used in various trades and/or which are normally transported by pick-up trucks, etc.

Figure 2:
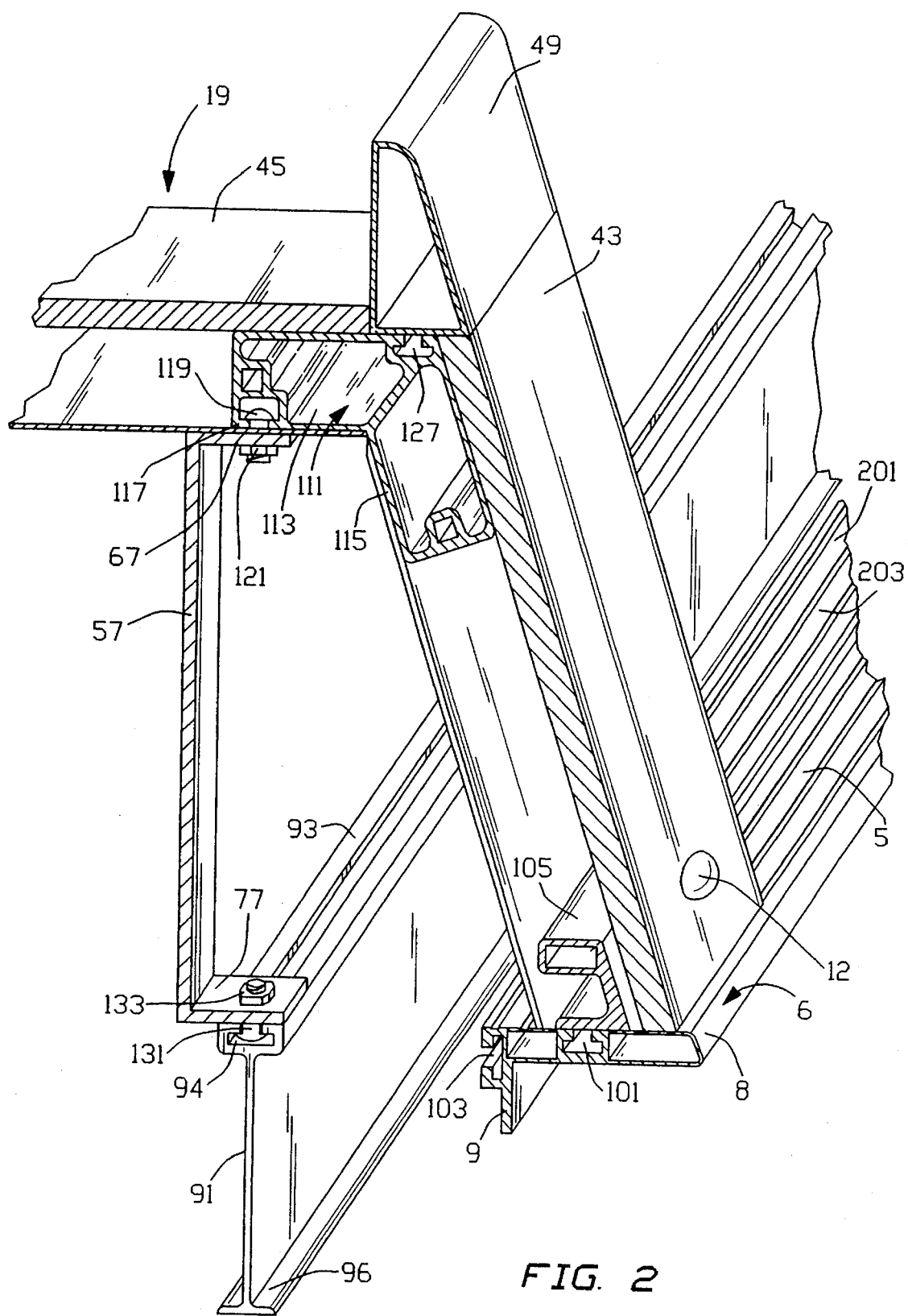
FIG. 2 shows an end perspective cut view of one side of the rack and a beam shown in FIG. 1 but also illustrating a useful infrastructure for the stanchion units.

FIG. 2 shows a partial end perspective view of a portion of the FIG. 1 present invention rack and inner support beam. Reference is now made to both FIGS. 1 and 2 together. Identical parts are identically numbered. FIG. 2 has more detail and shows the infrastructure of the stanchions. Here, base rail horizontal surface 5 has a T-slot 101 and parallel anti-skid grooves such as grooves 201 and 203. Its vertical surface 9 has a vertical T-slot 103. These are useful for mounting devices to the base rail 6 and T-slot 101 is also used to attach the stanchions. Thus, rearward stanchion unit 19 has vertical leg 43 attached to base rail 6 via bracket 105 which is connected to rail 6 via T-slot 101 with one or more T-fasteners, e.g. nuts and bolts (not shown) and to vertical leg 43 via bolt 12. Connecting piece 111 has a lower portion 115 and an upper portion 113. The lower portion is force fitted into vertical leg 43 and may also be bolted or welded, for example. Likewise, upper section 113 is force fitted into horizontal cross member 45 and further attached; as desired.

Connecting piece 111 has an optional T-slot 127 in its top which may be used to connect a lateral support block, such as block 49. Bottom T-slot 117 is used to connect suspension rod 57 therefrom with the use of a T-fastener, normally, bolt 119 and nut 121. Inner support beam 91 has a flat top 93 and a T-slot 94 for attachment to rod 57 at rod bottom 77, using bolt 131 and nut 133, as shown. Beam 91 also has a wide base 96 to enhance strength and help prevent bowing under heavy loads.

Figure 3:
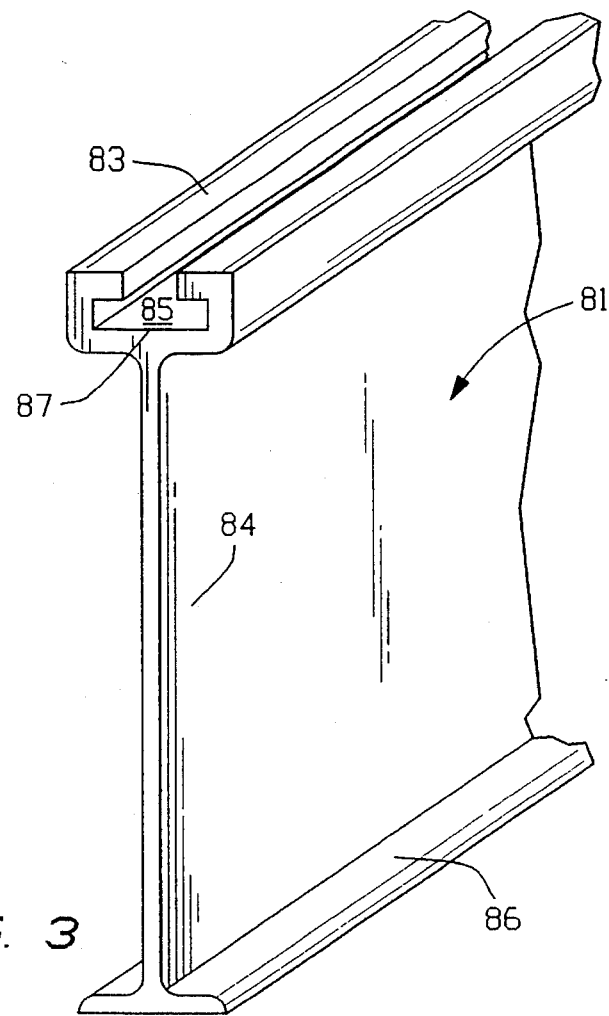
FIG. 3 illustrates a partial end perspective view of an inner support beam for a present invention utility rack.

Referring now to FIG. 3, inner support beam 81 has a flat top 83, a wide bottom 86 and a height dimension based mostly on flat plate 84 which is, in effect, a support web. Also, beam 81 has an optional T-slot 87 with upward opening 85, for connecting to a suspension rod.

While plate 84 is shown to be flat and solid, it could be open webbing, such as in the case of wire-based girders, or it could have openings therein, e.g. circular or triangular cut-outs, and it need not be flat. The support web of the present invention beam is a structural adjunct which is used to limit bowing of the beam, and any configuration which achieves this purpose may be used without exceeding the scope of the present invention.

The base rail of the present invention is a unistructurally formed elongated member with a generally L-shaped cross section having two segments. One segment is a vertical first segment with an outer surface and an inner surface adapted to fit against an inside surface of a cargo bed wall. The other segment is a horizontal second segment with an essentially planar top surface and a bottom surface adapted to nest atop the cargo bed wall. The inner surface of the vertical first segment and the bottom surface of the horizontal second segment meet at a 90° angle. An elongated horizontal T-slot runs along at least a portion of the elongated length of the horizontal second segment, with a T-slot opening facing upwardly away from the 90° angle. At least one totally enclosed hollow separate from the horizontal T-slot also runs along at least a portion of the elongated length of the horizontal segment separating its bottom surface from its top surface such that the opening of the horizontal T-slot is flush with the planar top surface of the horizontal segment. An elongated vertical T-slot also runs along at least a portion of the rail with a T-slot opening facing away from the horizontal segment and away from the 90° angle formed by the inside and bottom walls of the vertical and horizontal segments, respectively. The rails may be made of extruded metal or plastic. The horizontal segment of the rail may be adapted to fit either wider or more narrow thicknesses of cargo bed walls and may be wider than the vertical segment. Parallel anti-skid grooves may also be located on the top of the horizontal segment, however, even if these grooves are included, the top surface of the horizontal wall remains essentially planar.

Figure 4:
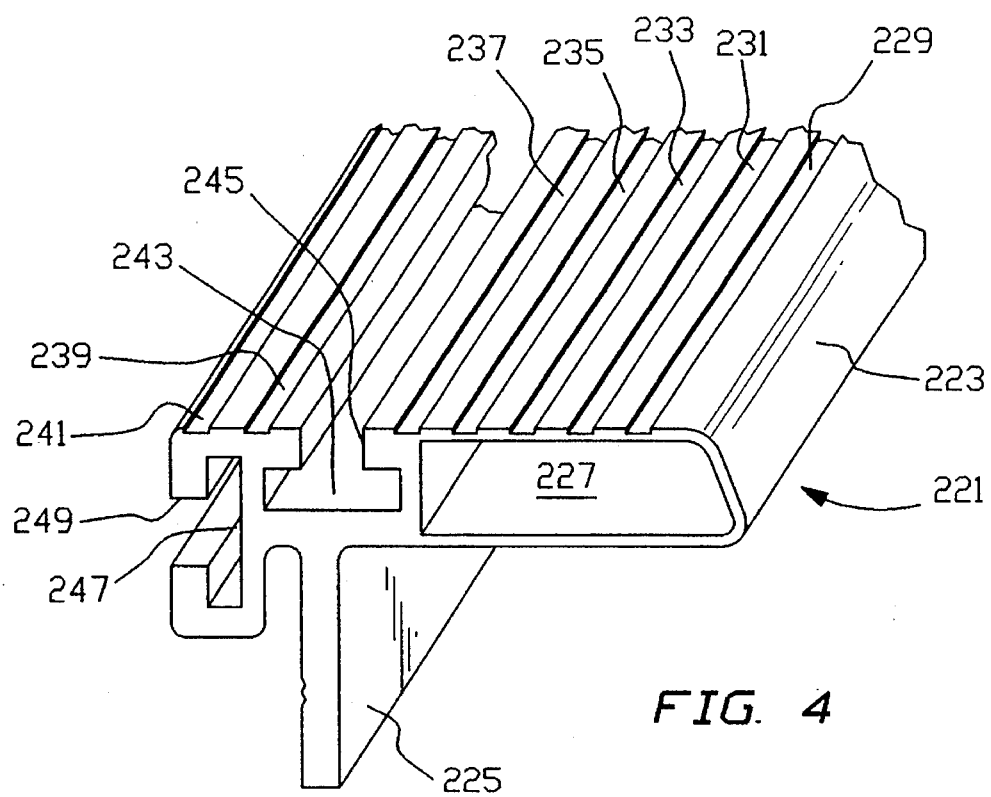
FIG. 4 shows a top perspective partial view of a base rail which may be used in a present invention utility rack.
Figure 5:
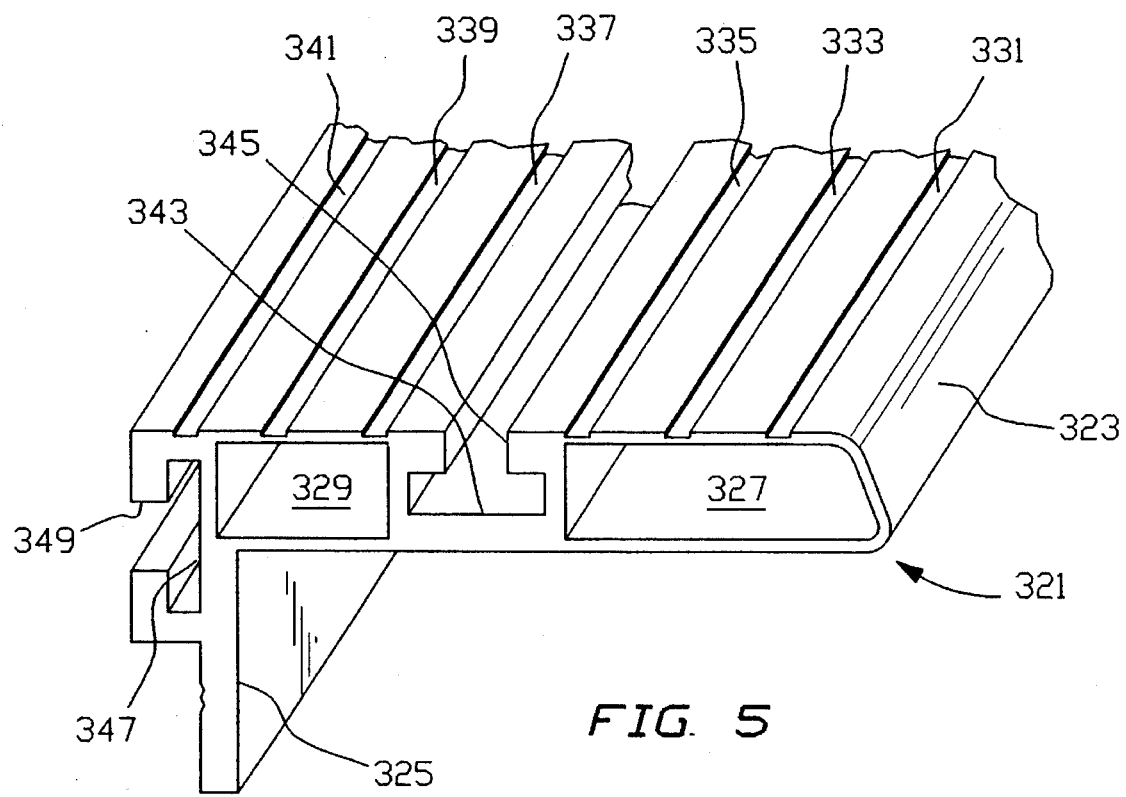
FIG. 5 shows a top perspective partial view of an alternative rail used in the present invention.

FIG. 4 and FIG. 5 show perspective views of two different base rails 221 and 321, which may be used in the present invention racks and are discussed here simultaneously. Rails 221 and 321 are discussed respectively. They have anti-skid grooves 229, 231, 233, 235, 237, 239, 241 and 331, 333, 335, 337, 339 and 341 on the tops of their horizontal segments 223 and 323. They also have hollow areas 227 and 327, and rail 321 has an additional hollow area 329, in their horizontal segments. They also have T-slots 243 and 343 with upwardly facing openings 245 and 345 on their vertical segments 223 and 323.

Rails 221 and 321 have vertical segments 225 and 325 and both have vertically arranged T-slots 247 and 347 with openings 249 and 349 facing away from their respective horizontal segments. However, T-slot 247 extends downwardly from horizontal segment 223 and does not connect with or formed as part of vertical segment, whereas T-slot 347 is integrally formed as part of vertical segment 325. The rail 221 is adapted for pick-up truck bed walls of narrow thickness and the rail 321 is adapted for bed walls of wider thickness.

Obviously, numerous modifications and variations of the present invention are possible in light of the above teachings. It is therefore understood that within the scope of the appended claims, the invention may be practiced otherwise than as specifically described herein.

What is claimed is:

1. A base rail, for a utility rack, which comprises:

a unistructurally formed elongated member with an elongated length with a generally L-shaped cross section having two segments, one being a vertical first segment with an inner surface and an outer surface, said inner surface adapted to fit against an inside surface of a cargo bed wall, and the other being a horizontal second segment with an essentially planar top surface and a bottom surface, said bottom surface adapted to nest atop said cargo bed wall, said inner surface of said vertical first segment and said bottom surface of said horizontal second segment meeting at a 90 degree angle;

an elongated horizontal T-slot running along at least a portion of said elongated length of said horizontal second segment, with a T-slot opening facing upwardly away from said 90 degree angle;

at least a first totally enclosed hollow separate from said horizontal T-slot running along at least a portion of said elongated length of said horizontal segment separating said bottom surface from said top surface such that said horizontal T-slot opening is flush with said essentially planar top surface of said horizontal segment;

an elongated vertical T-slot running along at least a portion of said unistructurally formed elongated member with a T-slot opening facing away from said horizontal segment and said 90 degree angle, said vertical T-slot extending downwardly from said horizontal second segment and said vertical T-slot being separated from said vertical first segment.

2. The base rail of claim 1 wherein said horizontal second segment is wider than said vertical first segment.

3. The base rail of claim 1 wherein said essentially planar top surface of said horizontal second segment includes a plurality of parallel anti-skid grooves.

4. The base rail of claim 1 wherein said elongated member is extruded metal.

5. The base rail of claim 1 wherein said elongated member is extruded plastic.

\* \* \* \* \*